US009274924B2

(12) United States Patent
Hentschel et al.

(10) Patent No.: US 9,274,924 B2
(45) Date of Patent: Mar. 1, 2016

(54) METHOD FOR THE COMPUTER-ASSISTED ANALYSIS OF SOFTWARE SOURCE CODE

(75) Inventors: Anja Hentschel, Müchen (DE); Christian Körner, Bergen (DE); Reinhold Plösch, Linz (AT); Stefan Schiffer, Vorchdorf (AT); Stephan Storck, Monmouth Jct, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 931 days.

(21) Appl. No.: 12/311,347

(22) PCT Filed: Sep. 26, 2007

(86) PCT No.: PCT/EP2007/060183
§ 371 (c)(1),
(2), (4) Date: Mar. 27, 2009

(87) PCT Pub. No.: WO2008/040664
PCT Pub. Date: Apr. 10, 2008

(65) Prior Publication Data
US 2010/0023928 A1    Jan. 28, 2010

(30) Foreign Application Priority Data

Sep. 29, 2006    (DE) .......................... 10 2006 046 203

(51) Int. Cl.
*G06F 11/36*    (2006.01)
*G06F 9/44*    (2006.01)

(52) U.S. Cl.
CPC .............. *G06F 11/3604* (2013.01); *G06F 8/70* (2013.01)

(58) Field of Classification Search
CPC ............ G06F 11/0793; G06F 11/3676; G06F 11/3692; G06F 15/00; G06F 11/3476
USPC .......... 717/124–131; 702/119, 123, 176–178; 703/23–28
See application file for complete search history.

(56) References Cited

U.S. PATENT DOCUMENTS 5,960,196 A  *  9/1999  Carrier et al. ................. 717/122
6,167,358 A  *  12/2000  Othmer et al. ................ 702/188
(Continued)

FOREIGN PATENT DOCUMENTS

WO    WO 98/27488    6/1998

OTHER PUBLICATIONS

Victor Basili and Dieter Rombach, Tailoring the Software Process to Project Goals and Environments, 1987, ICSE '87—Proceedings of the 9th international conference on Software Engineering, pp. 345-357.*
Ebert, C., "Software in Massen?", Technische Rundschau, Jun. 25, 1993, pp. 38-44, 46, 48, vol. 85, No. 25/26, XP000378554, Edition Coliberi AG, Wabem, CH and an English language abstract.
(Continued)

*Primary Examiner* — Jue Louie
*Assistant Examiner* — Sergio J Curbelo, III
(74) *Attorney, Agent, or Firm* — Harness, Dickey & Pierce, P.L.C.

(57) ABSTRACT

A method is disclosed for the computer-assisted analysis of a software source code. According to at least one embodiment of the method, the software source code is analyzed in consideration of parameters comprising encoding rules and/or encoding metrics, wherein as the analysis result errors detected in the software source code are calculated. The errors detected are classified by way of associating them with at lest one error category from a plurality of error categories. To this end, a specification that can be output via a user interface is associated with each error category, which describes the errors of the respective error category. The error categories with which the detected errors are associated are then output via a user interface.

5 Claims, 2 Drawing Sheets

(56) References Cited

U.S. PATENT DOCUMENTS

| | | | |
|---|---|---|---|
| 6,266,788 B1* | 7/2001 | Othmer et al. | 714/38.11 |
| 7,213,179 B2* | 5/2007 | Song et al. | 714/48 |
| 7,752,055 B1* | 7/2010 | Partezana | 705/1.1 |
| 8,132,156 B2* | 3/2012 | Malcolm | 717/124 |
| 8,401,882 B2* | 3/2013 | Reddy | 705/7.11 |
| 2001/0037493 A1* | 11/2001 | Herman et al. | 717/4 |
| 2002/0049962 A1* | 4/2002 | Kelbaugh et al. | 717/128 |
| 2003/0069869 A1* | 4/2003 | Gronau et al. | 706/46 |
| 2004/0078695 A1* | 4/2004 | Bowers et al. | 714/39 |
| 2004/0143811 A1* | 7/2004 | Kaelicke et al. | 717/101 |
| 2004/0230964 A1* | 11/2004 | Waugh et al. | 717/168 |
| 2004/0250175 A1* | 12/2004 | Draine et al. | 714/46 |
| 2004/0260940 A1 | 12/2004 | Berg et al. | |
| 2005/0223354 A1* | 10/2005 | Drissi et al. | 717/114 |

OTHER PUBLICATIONS

Nakamura, K., "Visual Representation Methodology for the Evaluation of Software Quality", IEEE, Nov. 27, 1989, pp. 627-630, XP010083895.

Yau, S. et al., "An Integrated Expert System Framework for Software Quality Assurance", Computer Software and Applications Conference, Compsac 90. Proceedings, Fourteenth Annual International, Oct. 31-Nov. 2, 1990, Chicago Il. and Los Alamitos CA., pp. 161-166, XP010019709.

Miller, George A., "The Magical Number Seven, Plus or Minus Two: Some Limits on our Capacity for Processing Information", The Psychological Review, 1956, pp. 81-97, vol. 63.

Evans, David et al., "Improving Security Using Extensible Lightweight Static Analysis", IEEE Software, Jan./Feb. 2002, pp. 42-51, vol. 19, Issue 1.

* cited by examiner

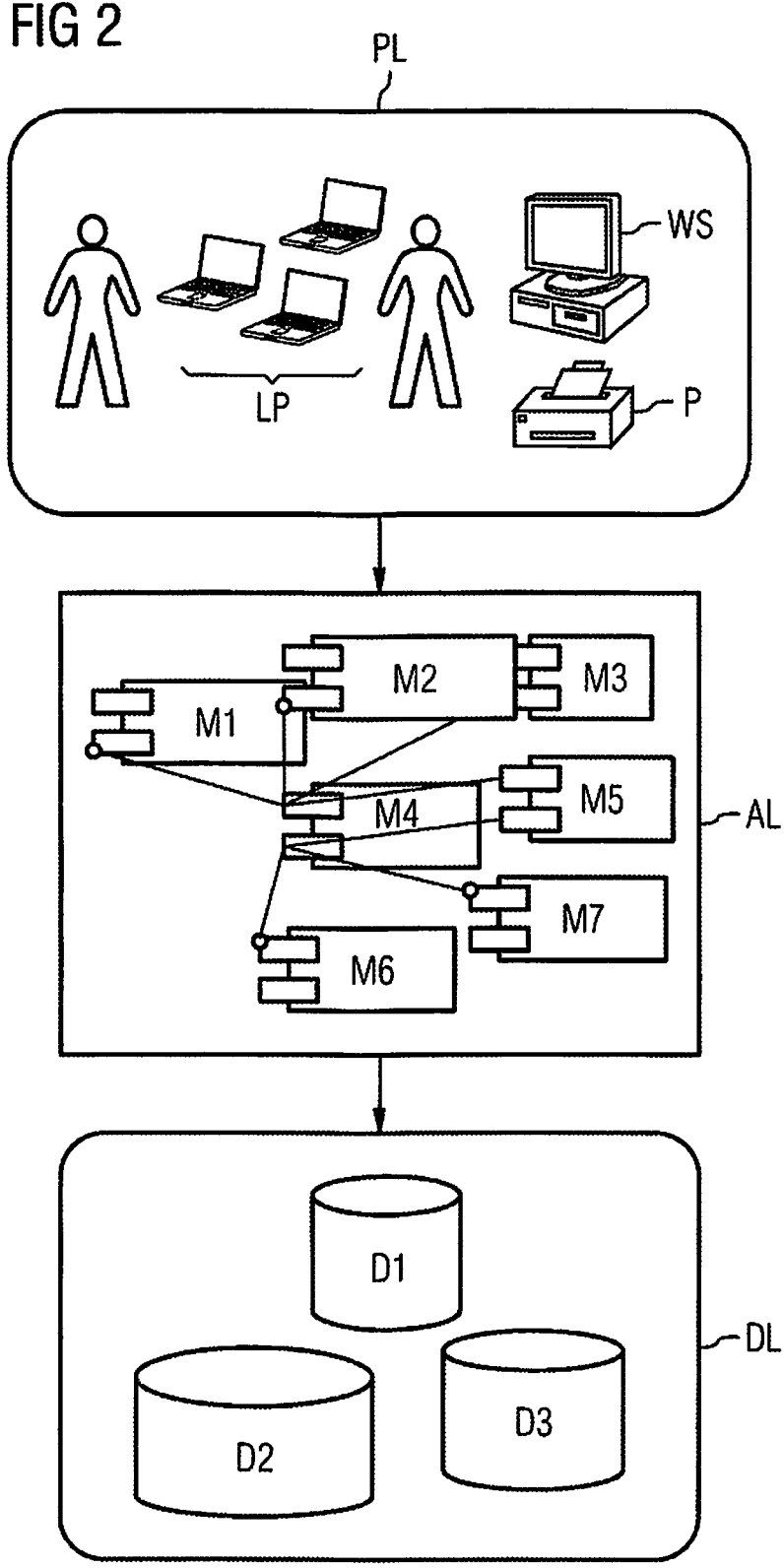

METHOD FOR THE COMPUTER-ASSISTED ANALYSIS OF SOFTWARE SOURCE CODE

PRIORITY STATEMENT

This application is the national phase under 35 U.S.C. §371 of PCT International Application No. PCT/EP2007/060183 which has an International filing date of Sep. 26, 2007, which designated the United States of America and which claims priority to German Application No. 10 2006 046 203.3 which has a filing date of Sep. 29, 2006, the entire contents of which is hereby incorporated herein by reference.

FIELD OF THE INVENTION

At least one embodiment of the invention generally relates to a method and/or a facility for computer-assisted analysis of software source code and/or to a corresponding computer program product. At least one embodiment of the invention deals with improving the code quality of software systems.

BACKGROUND

Improving the quality of software code involves a plurality of underlying difficulties. There are often no opportunities to verify that the software of non-trivial large systems is correct. In addition the large volume of source code which mostly increases greatly during the lifetime of a software system makes for difficulties in the analysis of the code.

Furthermore there is a plurality of problem points in large software systems, i.e. points potentially prone to errors. Often there are also not enough experts available for the analysis, assignment and resolution of manually or automatically determined problem areas in the software source code.

A further problem emerges in that software solutions now generally have to be created and updated in very short cycles. In addition there is a plurality of explicit and implicit informal requirements as well as formal and informal peripheral conditions to be considered with software systems. Further consideration has to be given to the fact that the development of software involves a plurality of changing approaches to the technical implementation, such as middleware, class libraries, different programming languages and runtime environments for example. The different implementations mostly concentrate in such cases only on specific technical aspects, without taking into consideration other aspects such as ensuring the quality of the software for example.

The coding error messages currently determined with static code analysis methods are as a rule largely unstructured and difficult to process because of the large volume of error messages. Therefore coding errors which are known per se are often not corrected over many development cycles. Similarly the case often occurs of coding errors being wrongly patched or patched with insufficient quality.

Current approaches to solutions for improving the quality of software source code are mostly not technical. In such cases there is primarily reliance on the experience of experts who attempt to completely read through the software source code in a structured manner. In these cases potential sources of errors are identified, pinpointed and documented by individual experts or in an expert team. The overall result is then mostly available, as well as a list of the errors and potential sources of errors identified, as a quality estimate in the form of a piece of prose. In many cases this quality estimate will be supplemented by a list of improvement instructions and recommendations.

Approaches are known from the prior art in which the error messages are grouped together by code analysis methods. This grouping is mostly very arbitrary. For example the error messages of the C++ analysis tool PC-Lint are only rudimentarily arranged in accordance with the problems that they produce. In addition approaches are known in which errors in the software source code are divided up into technical areas. The disadvantage of the known approaches to solutions is that, after the analysis of the software source code, a user is not given any simple structures which reveal which criteria are not fulfilled by the individual programming errors.

SUMMARY

At least one embodiment of the invention therefore creates a method and/or a facility for computer-assisted analysis of software source code, with which a structured categorization of the errors in the software source code is created, in a simple manner in order to then enable the software source code to be patched rapidly on the basis of the categorization.

In accordance with the method of at least one embodiment of the invention the software source code is first analyzed taking into account parameters comprising coding rules and/or coding metrics, with errors detected in the software source code being determined as the result of the analysis. A coding rule in such cases is a uniquely-defined specification which, if not met, breaks the rule.

By contrast a coding metric is a variable able to be determined from the software source code or the executable program which is an indicator for certain errors contained in the software. An example of a coding metric is the number of lines of code in software source code. Coding metrics are especially dependent on the technical peripheral conditions of the computer systems used, such as storage capacities, reaction times, throughput, restart options after an execution has been stopped, options for copying in updates etc. The detected errors are then classified by being assigned in each case to at least one error class from a plurality of error classes.

In order to create a simple and clearly-structured division into classes of errors, in accordance with the invention each error class is assigned a specification able to be output via a user interface which describes the error of the respective error class. Finally those error classes which are assigned detectable errors are output via a user interface. The definition of specifications, especially technical specifications, clearly determines in the categorization of errors which desired development goal was not achieved. Thus the user of the method is informed in a structured manner by the output of the error classes as to which specific requirements of the software source code were not met, in response to which the appropriate remedial action can be taken.

Preferably each error class is assigned one of the following programming categories:

A category relating to notation conventions;
A category relating to type declarations and/or definitions;
A category relating to program instructions;
A category relating to memory problems;
A category relating to software protocols;
A category relating to the design and/or the architecture of the software source code;
A category relating to the runtime behavior in the execution of the software source code.

In this way the errors are categorized according to programming criteria. A user is informed quickly and intuitively by this method about the programming areas in which predetermined requirements are not fulfilled.

In one embodiment of the invention the error classes are assigned to the programming categories via the detection mechanism with which errors of an error class are identified. In this way a clear and unique programming criterion is created via which errors are assigned to error classes.

In an example embodiment of the invention the specification of the respective error class includes one or more, especially all, of the following descriptions:

A description of a development goal which is to be achieved by rectifying the errors of the corresponding error class. The development goal is to clearly state the reasons why it is sensible to avoid the problems subsumed under this error class.

A description of the violation of the development goal which specifies the errors in the respective error class for which the development goal is not reached. In this description category there is an explicit description at a general level as to the circumstances under which the development goal is not achieved.

A description of the reasons for missing the development goal. Typical causes of the occurrence of problems in an error class are identified and discussed here.

A description of the possible corrections in software source code in order to achieve the development goal. The measures of techniques by which the development goal can be reached are described here.

A description of the detection mechanism, which specifies how errors will be detected in the respective error class. This describes how the problem described by the error class is identified. In the event of the error classes not being further divided into general and specific error classes, general detection techniques are outlined in a general error class, while for a concrete error class the precise specifications for the presence of the violation of a coding rule or for calculating values of a coding metric are specified.

The individual error classes can be sorted once more in accordance with their degree of abstraction. In particular the error classes can be divided up in accordance with a hierarchical taxonomy into general, specific and concrete error classes. To improve the overview, recognition and reproducibility of the classification, the taxonomy can be selected and arranged in accordance with 7+–2 rules known from prior art (see George A. Miller: The Magical Number Seven, Plus or Minus Two; The Psychological Review, 1956, Vol. 63, Pages 81 through 97). In this way different hierarchy levels of error classes are created, with the error classes always being more specific and more concrete at lower hierarchy levels.

The general error classes in this case group together the goals of each quality improvement process in any given form, namely the avoidance of precisely those errors which are finally able to be assigned to this general error class. They specify the direction or the sense and purpose of the error rectification or of the quality improvement.

By contrast specific error classes preferably group together a set of similar coding errors. They limit the reasons and the solution options. This makes a hierarchical structuring of the problem classes possible. This achieves a logical structuring of the concrete error classes and in addition creates the option of pre-specifying a solution direction for individual classes for rectifying the associated problems. Concrete error classes on the other hand are preferably allocated directly assigned coding rules and metrics which describe localized areas or exceeding of limit values of metrics. The errors in the concrete error classes are in particular assigned to solutions able to be automated for rectifying the problems.

The hierarchical structuring of the error classes can be used, starting from an identified problem, i.e. a general error class, for checking in a systematic manner what is causing the problem. This checking could then be undertaken systematically by checking the corresponding specific and concrete error classes.

In a further embodiment of the invention there is the further option of filtering detected errors in accordance with pre-specified criteria, so that the error classes displayed are restricted to specific errors which are of interest.

In an example embodiment of the inventive method an analysis of the detected errors is performed with, for each error class output, a quality analysis of the error class being output via a user interface on the basis of the errors contained therein. The user is thus given immediate feedback pertaining to how severe the errors contained in the software source code in the individual error classes are. Preferably an overall analysis of the quality of the software source code based on the quality analyses of the error classes is also determined and output via a user interface in the inventive method. In this way a user is given an immediate overview of how the overall quality of the software source code is to be assessed. The quality analysis of the error classes and/or the overall quality analysis are preferably based in this case on predetermined metrics. With such metrics the overall quality analysis in particular can be determined in a simple manner by summing the metrics of the quality analyses of the error classes.

In an example embodiment of the invention, the method is embodied such that a required quality of the software source code is able to be entered via a user interface, with the required quality being compared with the actual quality in accordance with the quality analyses of the error classes and/or the overall quality analysis and the corresponding comparison result being output via a user interface. This allows specific desired quality requirements determined by a user to be pre-specified, with the method automatically taking account of these quality requirements and outputting whether these quality requirements will actually be fulfilled by the software source code.

Preferably the quality analyses of the error classes and/or of the overall quality analysis are stored in a retrievable memory through which a quality history of different versions of software source codes is stored in the memory. This gives the user a very simple way of obtaining an overview as to how the quality has changed over the different software versions and whether the quality measures undertaken in the past have actually led to a significant improvement in the quality of the software. Preferably the respective actual qualities and required qualities of the versions of the software source code are also stored in the generated quality history.

In a further example embodiment of the invention, change requests for the software source code are generated from the quality analyses of the error classes and from the change requests change notifications are created, with the changes being assigned in a change notification to a person or to a group of people respectively who is or are responsible for making the changes in the change notification. In this way an allocation of the changes to be made in the software source code is automatically generated to the person responsible. Preferably criteria can also be entered via a user interface, with these criteria to be taken into account in the generation of the change requests. Such criteria are typically adapted to quality analyses, i.e. it has been determined manually by experts that, because of the external circumstances, the quality is to be analyzed in a slightly different way than has been undertaken automatically in an embodiment of the inventive method.

In addition, for example, priorities relating to the rectification of the errors can be predetermined, i.e. it can be defined which errors are preferably to be rectified. Such information can then be included in the automatically generated change notifications. In an example embodiment the change notifications are transferred automatically to the person or to the group of people responsible for making the change in the change notification. For example the change notification can be transferred automatically as a file via e-mail to the person responsible.

In a further embodiment of the inventive method, the change notifications can also contain information for making the change and/or an estimation of the effort involved in making the changes. In such cases any given metric can be used to define the effort, for example a cost metric which as a result specifies the man hours which need to be used to perform the change.

In an example embodiment of the invention, the instructions for making the changes also contain sample solutions for changing the software source code, with an effort involved in executing the sample solution preferably being assigned to each sample solution.

In a further embodiment of the inventive method the error classes include quality error classes which categorize the errors according to quality criteria. In particular the coding errors can be assigned a quality model, with a way of looking at the coding errors independent of a purely technical classification being created.

As well as the method described above, at least one embodiment of the invention further relates to a facility for computer-assisted analysis of software source code, comprising:

A means of analysis for analyzing the software source code taking into consideration parameters comprising coding rules and/or coding metrics, with errors detected in the software source code being determined by the analysis means as the result of the analysis;

A classification means for classifying the detected errors in that the detected errors are assigned to at least one error class in each case from a plurality of error classes, with each error class being assigned a specification able to be output via the user interface which describes the error of the respective error class;

An output means for outputting those error classes to which detected errors are assigned via the user interface.

At least one embodiment of the invention further relates to a computer program product with program code stored on a machine-readable medium for executing at least one embodiment of the inventive method described above when the program is executed on a computer.

Example embodiments of the invention will be described in detail below with reference to the enclosed figures.

BRIEF DESCRIPTION OF THE DRAWINGS

The figures are as follows:

FIG. 2 an embodiment of an inventive facility for computer-assisted analysis of software source code.

DETAILED DESCRIPTION OF THE EXAMPLE EMBODIMENTS

Figure 1:
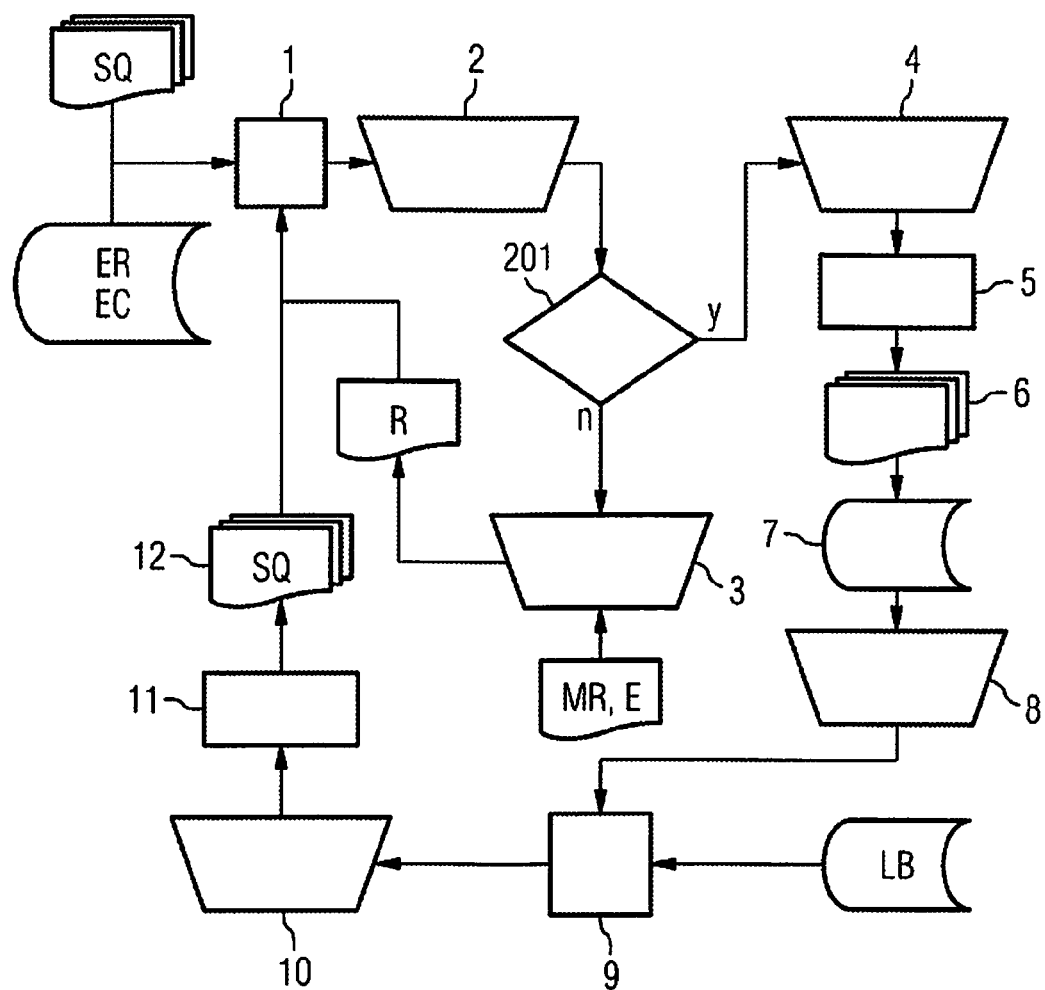
FIG. 1 a schematic diagram of a software development process in which an embodiment of the inventive method is used.

Described below is an embodiment of the inventive method which contains the classes already mentioned above: Notation conventions; Type declarations and/or definitions; Program instructions; Memory problems; Software protocols; Design and/or architecture; Correctness; Timing behavior.

Each of these error classes is assigned a specification in the form of a description which contains the following categories already mentioned above: Development goal; Violation; Reasons for missing the development goal; Corrections; Detection mechanism; Effects of missing the development goal.

Given below for each of the above-mentioned error classes is the corresponding description in accordance with description categories just mentioned.

1. Notation Conventions

A. Development Goal

The sources of software programs should be as legible as possible in order to be comprehensible and maintainable. The notation of the sources as text plays an important part here. The notations relate in this case especially to names for symbols and artifacts, to the style and to the documentation.

Names:

The required physical or virtual phenomena of an area of application given implicitly or explicitly in the requirements are designated systematically, uniquely and comprehensibly for both the technical expert and the software engineer.

Style:

Each programming language defines through its syntax the grammar, i.e. which content is to be expressed by the programming language in which way. The syntax does not define the form (indentations, parentheses, line breaks, format of comments etc.) in which programs must be written. There are also stylistic rules and nuances as to the context in which language constructs are to be used and how, and this is independent of whether alternate formulations are also possible as a results of the syntax of the programming language. The development goal in respect of the style is to use the programming language from the stylistic standpoint so that the stylistic rules established in the sector and found to be qualitatively good are adhered to.

Documentation:

Above and beyond the program code, the documentation supplies important information for understanding the software source code. In the documentation the software developer describes decisions which go beyond the design.

B. Violation

Names:

Names or identifiers in the program code are either ambivalent or do not allow a conclusion to be drawn about the underlying phenomenon of the application domains. In addition it can often be observed that individual developers or groups of developers establish a local vocabulary not able to be understood by outsiders.

Style:

Both a bad choice of name and also a bad programming style leads to a personalization of the software development, i.e. the corresponding program text can only then be maintained and further developed by the original developer of the program with justifiable economic outlay.

C. Reasons for Missing the Development Goal

Missing or linguistically non-uniform requirement specifications do not define a clear vocabulary which could be included for the naming. Thus the developers use random designators which are neither defined nor unique.

In older programming languages the length and the structure of identifiers were restricted for reasons of lack of resources or because of deficient compiler technology. Today there are still after-effects of these restrictions to be found even in the use of modern programming languages, although there is no longer any technical need for them.

Coding guidelines and best-possible implementation of these guidelines are not known or are not accepted by the software developer.

Further reasons for missing the development goal are a lack of awareness of the problem and/or a lack of overall understanding.

D. Correction

Specification of general naming conventions and project-specific naming conventions. The project-specific naming conventions govern how to handle the terms of the domains, by a glossary of important terms in the context of the software project being specified for example.

Specification of programmer guidelines, in which formatting queries (indentations, parentheses etc.) are defined. In addition the programmer guidelines describe which language constructs are to be understood in which way within a context.

Employee training

Execution of code checks focusing on choice of names in the programming language.

So-called re-engineering of code sections concerned on the basis of the name conventions and the programmer guidelines.

E. Detection mechanism

Adherence to programmer guidelines, i.e. adherence to stylistic requirements can generally be guaranteed in an automated manner by static code analysis tools. Adherence to naming conventions can—for general naming conventions—likewise be undertaken by corresponding static code analysis tools. The semantically-correct use of names in the context of the domains considered can only be manually ensured by corresponding reviews.

F. Effects

The effect of the source code is disorderly and technically poor. Non-unique identifiers cause communication problems. This has direct effects on the maintainability of the code.

2. Type Declarations and/Definitions

A. Development Goal

In a statically-typed programming language all identifiers are associated with those type names which best fit the context in which the identifier will be used. In this sense the type name is well chosen if no errors can occur in the use of the identifier or also no explicit type conversions are required.

The valid range of identifiers is to be selected so that only those types are outwardly visible which are also actually needed.

B. Violation

A violation of the development goal exists if types are used which are not meaningful in the context of the use of identifiers. A violation of the development goal further exists if the declaration of an identifier occurs so that the user of the identifier (e.g. the parameter of a method) because of the type used, knows about implementation details which from the practical standpoint should not have been known.

C. Reasons for Missing the Development Goal

No information on this topic is given in the programming guidelines.

Lack of understanding by the developer of general software design aspects, such as embodiment of interfaces, coupling and cohesion of types etc.

Lack of understanding of the type concepts of a programming language, e.g. interface inheritance, implementation inheritance, abstract classes etc.

Inadequate refactoring after design changes, i.e. the newly-created more general types as a result of a refactoring are not updated consistently in the overall source text, i.e. used instead of the old types.

Requirements are not defined or known for interface definition for example. Thus types will be defined here which must be corrected later during implementation.

D. Correction

Training of the developers with focus on software basics of the design and in respect of the type concepts of the respective programming language.

Improvement of the programming guidelines

Systematic execution of code reviews.

It can be worthwhile to allow violations within a sensible framework or for specific design concepts.

E. Detection Mechanism

Errors in respect of type declarations and definitions are determined for the control set of code analyzers or from control metrics derived from them, e.g. from the number of type conversions, the number of type violations etc.

F. Effects

The use of type conversion operators can—depending on the type conversion—result in a loss of computing accuracy and even cause a program to crash.

Disregarding the normal visibility rules for types in software engineering results in unnecessary coupling between individual software artifacts, which has a negative effect on the modifiability of the software source code.

3. Program Instructions

A. Development Goal

The basic development goal is to undertake the structuring of the source code in detail so that the usual software engineering criteria are able to be fulfilled. Detailed structuring is concerned with the following aspects:

Complexity of expressions, especially of logical and arithmetical expressions.

Adequate use of different loop constructs.

Adequate use of different selection instructions.

Complexity of functions and methods.

An at least approximately minimal and comprehensible sequence of instructions for implementing the required functional and non-functional features should be used. In this case the conceptional execution sequence is to be mapped in a suitable form.

B. Violation

The coding errors of this error class are dependent on the type of the instruction. Either the instruction contains semantically-incorrect components or the instruction is at least semantically dubious, superfluous, too complex or incomplete.

C. Reasons for Missing the Development Goal

The software developers do not have enough time or enough training.

D. Correction

The instruction used by the software developer must first be described and then encoded. A method for avoiding instruction errors is so-called. "literate programming". The correction can possibly be made by the developer after training.

E. Detection Mechanism

Instruction errors are detected from the control set of the code analyzers and control metrics derived from there, e.g. from the number of dubious, redundant and unachievable statements.

F. Effects

A violation of the development goal or goals can—depending on the type of violation—have a negative effect on the correctness of the program.

If there are no effects on the correctness, the violation of the development goal produces software code which is difficult to maintain, which once again can only be maintained and further developed in the first instance by the original developers with economically justifiable outlay.

4. Memory Problems
A. Development Goal
The development goal is to be sparing in use of main memory, i.e. only to allocate the necessary memory at a suitable point in time and if necessary to release it in good time. In addition it must be ensured that the main memory space is in a consistent state at any point in time. It must further be ensured that variables that explicitly reference memory are in a consistent state at any given point in time, i.e. do not feature any undesired zero values, do not contain any incorrect memory addresses, etc.

B. Violation.
A violation of the development goal exists if memory is allocated in an unnecessary way and the timely release of memory again has been forgotten.

The development goal can be further violated by improper use of language constructs, with such language constructs leading to incorrect manipulations of memory content or memory addresses. Operators which are typically used improperly are arithmetic address operations and type conversion operators.

C. Reasons for Missing the Development Goal
Reasons are especially lack of time and training for the software developers, as well as lack of design concepts.

D. Correction
Memory problems can be corrected by the developers themselves, possibly after training.

E. Detection Mechanism
Memory problems can be determined from the set of rules of the code analyzers and control metrics derived therefrom, e.g. from the number of dubious or incorrect statements which change the state of the memory.

F. Effects
Errors in the administration of the memory lead to inconsistent states or to high memory consumption and often indirectly call into question the implementation of the desired functional and non-functional characteristics of the program, especially the runtime stability.

5. Software Protocols
A. Development Goal
Software protocols describe the sequence in which processes defined by programming are to be executed. An example of a software protocol is the publication of an interface protocol for example. The development goal in this case is to take account of the software protocols in the programming in such a way that the program keeps the system state consistent. For this call sequences of procedures are defined and these are linked to specific states and inputs. This is especially important for example with asynchronous systems, in error situations, in the use of concurrency using multiple simultaneously used external resources.

B. Violation
The development goal is violated if procedures are called in a sequence or under the wrong conditions, so that an inconsistent system state arises.

C. Reasons for Missing the Development Goal
The implicit or explicit predetermined protocols are not taken into account. Implicit protocols are not sufficiently known or documented.

D. Correction
Explicit protocols should be comprehensibly documented. The developers should have been trained in the protocols used.

E. Detection Mechanism
The violation of software protocols can be detected by manual reviews, the analysis of call trees with data flow analysis or the automatic systems used. The protocols can also be checked automatically by static and dynamic code analysis tools.

F. Effects
A software system in an inconsistent or unstable state is produced.

6. Design and Architecture
A. Development Goal
The primary development goal is to arrange the architecture and the design of a system so that the functional and non-functional requirements imposed on said system are fulfilled and also expected changes and expansions of the requirements are anticipated in the design or in the architecture. As well as the product-specific and project-specific requirements, the architecture and the design must fulfill the software quality requirements. These requirements are especially:
Ensuring high, especially functional cohesion within a module or a subsystem.
Ensuring little coupling between modules within a subsystem or between subsystems.
Appropriate complexity in the sense of the methods or types made available by a module or a subsystem.

B. Violation
Violations of the development goal exist if the defined functional and non-functional requirements cannot be fulfilled because of a badly-selected design or a badly-selected architecture. A violation also exists when, although the project-specific or product-specific requirements are fulfilled, coupling, cohesion and complexity are not appropriate.

C. Reasons for Missing the Development Goal
Reasons are especially a lack of architecture for the software system to be developed.

Further reasons are absence of time and control of the implementation of the architecture or lack of resources for the systematic restructuring of software systems.

Further reasons are unnecessary relationships within the software system as well as the division of the system not according to architectural criteria, such as coupling and cohesion for example, but according to location or user.

A further reason is that the software system has not been sufficiently maintained because of lack of time.

D. Correction
An architect or project leader (if no architect is available) must be employed in the development of the software source code.

E. Detection Mechanism
Errors in design or architecture can be determined manually or using an analysis tool (e.g. Sotograph).

F. Effects
Development and maintenance costs increase. In extreme cases the system can no longer be maintained and has to be rewritten.

7. Correctness
A. Development Goal
Correctness here is not understood as a solution explicitly meeting specified requirements. Instead, from the standpoint of the internal code quality, it is matter of identifying those points in the code which must be incorrect regardless of the actual requirements.

B. Violation
A violation exists if the source text obviously contains errors which are independent of the concrete requirements. Examples of this are switches in switch instructions which can never be reached or unused local variables.

C. Reasons for Missing the Development Goal

These mostly involve lack of understanding by the programmer or logical coding errors.

D. Correction

Misunderstandings can be corrected by corresponding training of the developer. Coding errors can be corrected by the developers themselves.

E. Detection Mechanism

There is the option of statically detecting correctness errors if a formal description of the desired result together with the imperative implementation is available. A discrepancy, mostly only in subareas, can then be established. In addition code reviews and inspections can be conducted to discover these errors.

F. Effects

Correctness errors call into question the realization of the implicit requirements of the software system.

8. Runtime Behavior

A. Development Goal

Software systems must carefully manage the computing time available to them, and must do this independently of the concrete timing behavior demanded by the specification. In addition each software system must use the correct constructs for the synchronization of parallel execution contexts. This relates both to the synchronization in distributed systems and also to the synchronization within an operating system process. Time-dependent systems and systems with interfaces to time-dependent systems are subject to special requirements here.

B. Violation

A violation of the development goal occurs if the system has inadequate synchronization mechanisms. The observed consequences are blockages, sequence problems, pointless operations, inefficient algorithms, inadequate response times and lack of throughput.

C. Reasons for Missing the Development Goal

The software system was only designed, developed and tested for one processing context. The developers of the system have no experience with associated systems, i.e. with systems with a number of simultaneously processed processing contexts.

D. Correction

The problem can be corrected by training the employees, by re-design of the software code or by code correction.

E. Detection Mechanism

Errors in the timing behavior can be detected by data flow analysis using call graphs or by checking coding rules.

F. Effects

Systems with deficiencies in the timing behavior are unstable, unreliable and have difficulties in guaranteeing the desired response times of the desired throughput.

As well as the eight error classes described above, further error classes can occur if necessary, which for example are grouped together into a "Miscellaneous" category. Technology, domain or project-specific error classes are collected together in these categories;

FIG. 1 shows a flow diagram of a software development process in which an embodiment of the inventive method is embedded. The software system is present as the starting point of the method in the form of software source code SQ. Initially in accordance with the inventive method the software source code is analyzed on the basis of coding rules or metrics, which is indicated by step 1. As a result corresponding coding errors ER are classified, i.e. allocated to a corresponding error class EC. Known static code analysis tools or other methods such as standard test procedures can be used for the analysis of the software code for example. The test procedures and their parameters can for example originate from the last iteration of the project, i.e. the last software version. In this case the coding rules or metrics are adapted according to predetermined requirements.

After the creation of the corresponding error classes, in a step 2, an overall analysis of the quality of the selected parameter set of the test procedures is undertaken by experts. The limit values are selected as a function of domains, architecture and software technology. In step 201 a check is then performed as to whether the error classes which are determined automatically with the inventive method coincide with the overall analysis undertaken by experts in step 2. Should this not be the case (N=No), an expansion and adaptation of the coding rules and coding metrics is undertaken in step 3. This process incorporates manual rules MR and experience E. A set of rules R adapted in this way is then incorporated into the method in accordance with the invention, with the corresponding errors ER and error classes then being determined again in step 1 in accordance with the adapted rule set. Steps 1, 2, 201 and 3 are repeated until such time as it is established in step 201 that result of the experts coincides with the automated result determined by the inventive method. In this case (Y=Yes) the method jumps to step 4.

In step 4 the quality goals are agreed or adapted with those responsible (subproject leaders or their quality assurance representatives). In this case quality goals to be achieved are agreed in particular or quality goals already defined are adapted.

In step 5 the actual quality of the software source code is compared to the required quality. In accordance with step 6 an analysis result is then output, which, for the present software source code version contains the comparison of required quality and actual quality. The analysis is stored in step 7 in a memory in which the quality history of previous software source code versions is stored.

Finally, in step 8 a manual check is made on the result of the analysis, with possible changes being made in respect of change requests generated in the next step. This analysis is also called "code quality control". In this case the code is checked once more and possible adaptations of the quality analyses are undertaken or priorities defined in respect of changes to be made.

Finally, in step 9 the change requests are generated automatically and the change notifications to the appropriate persons responsible are generated automatically, possibly with a suggested solution and a cost estimate. Suggested solutions, especially sample solutions, are taken in such cases from a solution database LB.

Finally in step 10 the changes transferred in accordance with the change notifications are incorporated into the software source code and finally integrated in step 11. As a result a new version of the software system is finally obtained in step 12 with new software source code SQ. The new source code is then included again in step 1 of the method for new testing of the new version.

The previous steps 10 to 12 are standard steps of a software creation process. The execution of the previously illustrated steps 2 to 9 on the other hand is based quite essentially on the error classification developed in accordance with an embodiment of the invention. In particular the error classification allows:

The definition of targets at a general, abstract level, which is predetermined by the classification and which is suited to being understood by subproject leaders or those responsible for quality assurance.

The systematic overall assessment of the software source code in a manner enabling information to be provided as to which technical problem areas are to be assessed as quite especially good or quite especially bad. This aggregation, which automatically accompanies the assessment of the software quality also makes the planning of measures significantly easier.

Easier comparison of required quality and actual quality of the software source code considered, since comparison does not have to be made at the level of individual metrics but can be defined systematically at higher level by the corresponding classification.

The generation of change notifications to those responsible, because possible suggested solutions can already be assigned quite generally to a class of problem and do not have to be assigned to the individual metric or the individual rules.

The embodiment of the inventive method just described allows an automated improvement of the quality of a software source code by way of explicit handling of errors contained in the software source code. In this case different error classes are predetermined, and these error classes are assigned detection mechanisms for detection of errors. The software source code is tested by way of the detection mechanisms and errors detected during this process are assigned to an error class. Inventively different types of error contained in the software source code can be systematically and efficiently detected and handled. By its increased degree of automation and its ability to focus on the critical technical aspect, the method significantly reduces the effort for controlling the software code quality. It forms a bridge from the error detection methods of classical code analysis to explicit improvement measures which efficiently improve the quality of the code.

FIG. 2 shows an example embodiment of a facility with which the inventive method can be implemented. The facility includes user interfaces which are grouped into a presentation layer PL. Examples of such user interfaces, with which the results of an embodiment of the inventive method are displayed, are laptops LP, a workstation WS and also a printer P. The user interfaces interact with different modules which are grouped into an application layer AL.

In this case a module M1 is provided which represents a report generator. This module delivers as its result the change notifications generated in accordance with the invention. In addition an interaction module M2 is provided which represents the interface to the presentation layer PL. The actual inventive method, i.e. the classification of the errors, is undertaken in the module M3, which represents an analyzer.

In module M5 comparison is made between the determined required quality and the actual quality. In addition a statistics module M7 is provided which conducts statistical analysis in relation to the errors found. Furthermore a data interface is provided as module M6 which represents an interface through to the data layer DL explained below. In addition a control unit is provided as the central module M4 in the application layer AL which controls the interaction between the other modules.

The data layer DL contains the data processed or created in the inventive method. Three data records D1, D2 and D3 are specified as examples. In the embodiment described here the data record D1 is a CM-system (CM=Configuration Management) which is a project-specific data system for managing the software project concerned. Furthermore a method management is provided as data record D2 which manages the methods of classification and error detection. This data record is organization-specific but cross-project. Furthermore the quality history D3 of the earlier software versions is contained in the data layer DL. The quality history D3 is cross-organizational and cross-project.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for computer-assisted analysis of software source code, the method comprising:
    analyzing, by a computer processor, the software source code, taking into account parameters including at least one of coding rules and coding metrics, with errors detected in the software source code being determined as a result of the analyzing; and
    classifying, by the computer processor, the detected errors by assigning each of the detected errors respectively to at least one error class from a plurality of error classes, with each error class being assigned a specification, the specification for each error class describing the error of the respective error class, the plurality of error classes including,
    a class relating to notation conventions,
    a class relating to a type of at least one of declarations and definitions,
    a class relating to program instructions,
    a class relating to memory problems,
    a class relating to software protocols,
    a class relating to at least one of design and architecture of the software source code,
    a class relating to the correctness of the software source code, and
    a class relating to the timing behavior in the execution of the software source code;
    outputting the error classes to which detectable errors are assigned via the user interface,
    wherein the specification includes,
    a description of a development goal to be achieved by rectifying the error of the corresponding error class,
    a description of a violation of the development goal which specifies the error type in the respective error class for which the development goal is not reached,
    a description of the reasons for missing the development goal,
    a description of the possible corrections needed in the software source code in order to achieve the development goal,
    a description of the detection mechanisms which specifies how errors in the respective error class will be detected, and
    a description of the effects of missing the development goal.

2. The method as claimed in claim 1, wherein,
    the class relating to notation conventions takes into account names for symbols and artifacts, style of programming language, and documentation about the software source code,
    the class relating to the type of at least one of declarations and definitions takes into account identifiers and the context in which the identifiers are used,
    the class relating to program instructions takes into account complexity of expression within the software source code,
    the class relating to memory problems takes into account allocation and release of memory resources,
    the class relating to software protocols takes into account a sequence in which processes are defined,
    the class relating to at least one of design and architecture of the software source code takes into account product-specific requirements, the class relating to the correctness of the software source code takes into account parts of the software source code which are incorrect, and the class relating to the timing behavior in the execution of the software source code takes into account synchronization mechanisms.

3. A method for computer-assisted analysis of software source code, the method comprising:

analyzing, by a computer processor, the software source code, taking into account parameters including at least one of coding rules and coding metrics, with errors detected in the software source code being determined as a result of the analyzing;

classifying, by the computer processor, the detected errors by assigning each of the detected errors respectively to at least one error class from a plurality of error classes, with each error class being assigned a specification, the specification for each error class describing the error of the respective error class, the plurality of error classes including, a class relating to notation conventions,
a class relating to a type of at least one of declarations and definitions,
a class relating to program instructions,
a class relating to memory problems,
a class relating to software protocols,
a class relating to at least one of design and architecture of the software source code,
a class relating to the correctness of the software source code, and
a class relating to the timing behavior in the execution of the software source code;

outputting the error classes to which detectable errors are assigned via the user interface, wherein, the class relating to notation conventions takes into account names for symbols and artifacts, style of programming language, and documentation about the software source code, the class relating to the type of at least one of declarations and definitions takes into account identifiers and the context in which the identifiers are used, the class relating to program instructions takes into account complexity of expression within the software source code, the class relating to memory problems takes into account allocation and release of memory resources, the class relating to software protocols takes into account a sequence in which processes are defined, the class relating to at least one of design and architecture of the software source code takes into account product-specific requirements, the class relating to the correctness of the software source code takes into account parts of the software source code which are incorrect, and the class relating to the timing behavior in the execution of the software source code takes into account synchronization mechanisms.

4. A system for computer-assisted analysis of software source code, comprising:

a non-transitory computer readable medium including executable instructions, and at least one processor configured to execute the executable instructions to, analyze the software source, taking into consideration parameters comprising at least one of coding roles and coding metrics, with errors detected in the software source code being determined as a result of the analysis, and classify the detected errors, the detected errors being assigned to at least one error class in each case from a plurality of error classes, with the specification of each error class describing the error of the respective error class, the plurality of error classes including, a class relating to notation conventions,
a class relating to a type of at least one of declarations and definitions,
a class relating to program instructions,
a class relating to memory problems,
a class relating to software protocols,
a class relating to at least one of design and architecture of the software source code,
a class relating to the correctness of the software source code, and
a class relating to the timing behavior in the execution of the software source code, the specification including, a description of a development goal to be achieved by rectifying the error of the corresponding error class, a description of a violation of the development goal which specifies the error type in the respective error class for which the development goal is not reached, a description of the reasons for missing the development goal, a description of the possible corrections needed in the software source code in order to achieve the development goal, a description of the detection mechanisms which specifies how errors in the respective error class will be detected, and a description of the effects of missing the development goal, and perform quality analyses for the plurality of error classes based on the detected errors, the quality analyses indicating a severity of detected errors in the plurality of error classes, and output the error classes to which detected errors are assigned and the quality analyses via the user interface.

5. The system as claimed in claim 4, wherein, the class relating to notation conventions takes into account names for symbols and artifacts, style of programming language, and documentation about the software source code, the class relating to the type of at least one of declarations and definitions takes into account identifiers and the context in which the identifiers are used, the class relating to program instructions takes into account complexity of expression within the software source code, the class relating to memory problems takes into account allocation and release of memory resources, the class relating to software protocols takes into account a sequence in which processes are defined, the class relating to at least one of design and architecture of the software source code takes into account product-specific requirements, the class relating to the correctness of the software source code takes into account parts of the software source code which are incorrect, and the class relating to the timing behavior in the execution of the software source code takes into account synchronization mechanisms.

* * * * *